United States Patent Office 3,043,802
Patented July 10, 1962

3,043,802
LIGHT-SENSITIVE HIGH MOLECULAR POLYCARBONATES
Wilhelm Thoma, Leichlingen, and Heinrich Rinke, Leverkusen, Germany, assignors to Farbenfabriken Bayer Aktiengesellschaft, Leverkusen, Germany, a corporation of Germany
No Drawing. Filed Aug. 17, 1959, Ser. No. 833,978
Claims priority, application Germany Aug. 18, 1958
9 Claims. (Cl. 260—47)

This invention relates to light-sensitive high molecular compounds. More particularly, the invention is concerned with light-sensitive high molecular compounds formed from polycarbonates, a method for producing the new light-sensitive high molecular compounds and certain applications of the same.

It is known to cross-link plastics with high energy content rays, such for example as X-rays, gamma rays and electron beams. It is for example possible in this way to raise the softening point of polyethylene. It is also known that modified polyvinyl alcohols containing several cinnamoyl or chalcone radicals can be cross-linked and made insoluble with actinic light, for example with ultra-violet light.

It is an object of the present invention to provide light-sensitive high molecular compounds which are eminently suitable for the preparation of difficult reproductions. Another object is to provide a process for producing these new light-sensitive high molecular compounds on the basis of polycarbonates. A further object is to provide a method of converting these light-sensitive high molecular compounds into cross-linked insoluble products. A further object is to provide a new reproduction technique using these light-sensitive high molecular compounds. Still further objects will appear hereinafter.

It has now been found in accordance with the present invention that high molecular compounds which can be cross-linked and thus rendered insoluble by the action of light can be obtained by forming polycarbonates starting from bis-phenols or their bis-hydroxy alkyl ethers which contain one or more —CH=CH—CO— groups in the molecule.

The invention may in other words be characterized in that the known processes leading to polycarbonates instead of the usual polycarbonate forming bis-phenols or their bis-hydroxy alkyl ethers there are wholly or partially employed those bis-phenols or their bis-hydroxy alkyl ethers which contain one or more —CH=CH—CO— groups in the molecule.

The polycarbonates obtained according to the invention, especially after they have been shaped to form films, foils, or filaments, become sparingly soluble or insoluble under the action of actinic light, for example ultra-violet light, X-rays, in the light of an arc lamp or even in the light of a relatively strong incandescent lamp, and their properties are decisively modified.

As bis-phenols containing —CH=CH—CO— groups the following are mentioned as examples:
4.4'-dihydroxychalcone, 3,4'-dihydroxychalcone, 2,4'-dihydroxychalcone, 2',4-dihydroxychalcone, 2',3-dihydroxychalcone, 2,2'-dihydroxychalcone, 2,5'-dihydroxychalcone, 3,4'-dihydroxychalcone, 3',4'-dihydroxychalcone, 2',4-dihydroxy-3-methoxychalcone, 4,4'-dihydroxy-3-methoxychalcone, 2,4'-dihydroxy-3-methoxychalcone, 2,2-dihydroxy-3-methoxychalcone, 4,4'-dihydroxy-3-ethoxy chalcone, 2,4'-dihydroxy-3-propoxy chalcone, 4,4'-dihydroxy-3-nitro chalcone, 2,4'-dihydroxy-3-chloro chalcone.

In general any substituted dihydroxy chalcone can be used in the process of the present invention it also being possible to use their bis-hydroxy alkyl ethers including the bis-hydroxy polyalkyl ethers. That includes the reaction products of the above chalcones with 1 to 10 mols or more of ethylene oxide, propylene oxide, butylene oxide, ω-chlorohexyl alcohol, allyl alcohol or epichlorohydrin. In the latter case the epoxy ring is opened with water.

It is also possible to employ for the present process monooxy chalcones such as 4-oxy chalcone, 4'-oxy chalcone, 3-oxy chalcone, 3'-oxy chalcone when reacted with epichlorhydrin and thereafter with water to provide for two hydroxyl groups in the modified monooxy chalcone.

Reference is also made to the condensation products of hydroxy cinnamic acid derivatives and phenol alcohols or phenol amines, i.e. to compounds of the following formulae, in which $x$ represents 0 or a whole number and R can represent a hydrogen atom or an alkyl radical:

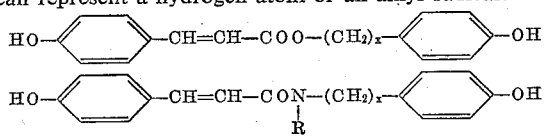

It is particularly advantageous in the production of light-sensitive polycarbonates to use those bis-phenols or their hydroxyalkyl ethers which contain several

—CH=CH—CO groups in the molecule, whereby the quantity of the component producing the subsequent cross-linking of the polycarbonate by light can be greatly reduced. By way of example, there are mentioned the condensation products of terephthalic or isophthalic dialdehydes and 2-, 3- or 4-hydroxyacetonephenones:

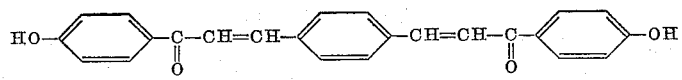

the condensation products of 1 mol of a diacetyl benzene and 2 mols of an aromatic hydroxyaldehyde, for example the compound of the formula

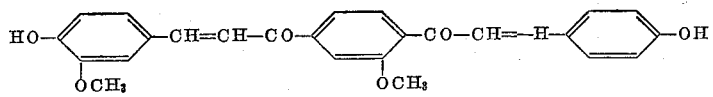

and also dihydroxy distyryl ketones such for example as 2,2'-, 3,3'-, or 4,4'-dihydroxy distyryl ketones or the 4,4'-dihydroxy-3,4'-dimethoxy distyryl ketone of the formula

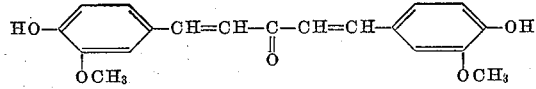

and finally condensation products of hydroxycinnamic acid derivatives and aminohydroxychalcones. These condensation products conform to the formula

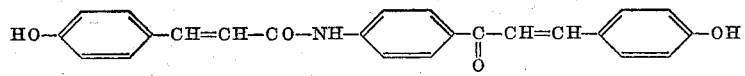

From these starting materials the polycarbonates are prepared by known processes which are summarized in Angewandte Chemit 68, 1956, pages 633–640. The polycarbonates are prepared by the action of phosgene on an alkaline solution of the bis-phenols in the presence of organic solvents. Such solvents are for instance methylene chloride nad chloroform. Instead of using an aqueous organic phase it is possible to perform the reaction for instance in pyridine. The reaction proceeds even at room temperature.

Another method of preparing polycarbonates consists in the melt condensation of bis-phenols or bis-hydroxy alkyl ethers of bis-phenols or mixtures thereof with diphenyl carbonate in the presence or absence of catalysts. It is preferable to use the diphenyl carbonate in a not too great excess. In the melt condensation process the temperatures preferably are kept below 250° C. since otherwise cross-linking occurs readily. Suitable catalysts in the melt condensation process are the known ester interchange catalysts especially the alkali alcoholates such as sodium methylate or lithium hydride.

Together with the above-mentioned bis-phenols or their bis-hydroxy alkyl ethers containing —CH=CH—CO— groups in the molecule it is possible to employ other bis-phenols or bis-hydroxy alkyl ethers known in the art to form polycarbonates.

To give an example the following should be mentioned: 2,2-(4,4'-dihydroxy diphenyl)-popane, 1,1-(4,4'-dihydroxy diphenyl)-cyclohexane, hyroquinone, resorcinol, 1,5-dihydroxynaphthalene, 4,4'-dihydroxydiphenyl or their hydroxyalkyl or polyhydroxyalkyl ethers. Simple glycols, polyethers or polyether-thioethers having terminal OH groups can also be used concurrently in known manner.

These additional phenols should only be employed in such an amount that the final product contains at least 1% by weight of —CH=CH—CO— groups if the product for instance in form of fibers or foils is to be subjected to the action of light to improve the mechanical characteristics of the fibre or foil. If the product is to be employed for photomechanical reproduction purposes it should contain at least 5% by weight of —CH=CH—CO— groups.

If the light-sensitive high molecular compounds of the present invention are exposed to the action of light, their physical and chemical properties are changed more or less quickly. It is believed that these changes are the result of a cross-linking reaction involving dimerization or polymerization at the —CH=CH—CO— groups but we do not want to be restricted to any particular theory with respect to this phenomenon. A very wide range of different light sources can be used, depending on the structure of the light-sensitive high molecular weight substances. Light having a high proportion of ultra-violet rays is particularly effective. The speed and the degree of cross-linking depend upon the amount of incident light and its wavelength, the amount of the

—CH=CH—CO—

groups in the polymer and also the molecular weight of the latter. The speed of the cross-linking caused by irradiation by light can be further increased by adding so-called sensitisers. Compounds from the classes comprising cyanines, triphenyl methane dyestuffs and dyestuffs of the benzanthrone, quinone or anthraquinone series can be used with particular advantage as such sensitisers. By means of these dyestuffs, the said reaction products are also sensitised with respect to visible light. The degree of cross-linking depends upon the period of incident light and the amount of —CH=CH—CO— groups in the polymer. It can therefore be varied in a convenient manner. These substances cross-linked by the irradiation by light become insoluble, harder and less sensitive to acids and alkali and to solvents.

Films, foils or filaments are obtained from polycarbonates which are very essentially modified in their properties by comparison with those not having

—CH=CH—CO—

groups, especially after exposure to light by incorporation of those hydroxyalkylated bis-phenols which contain one or more —CH=CH—CO— groups in the molecule. With foils, filaments or films containing up to about 20 mol percent of components which can be optically cross-linked, the tensile strength, elongation, E-modulus and the edge tearing strength are increased after exposure with ultra voilet light. The impact sensitivity and solubility in organic solvents are decreased. Polycarbonates with a content of more than about 20 mol percent of components which can be cross-linked optically show such a high sensitivity on irradiation with ultra-violet light so that structures such as films and filaments, formed therefrom, cross-link in a short period of from a few seconds to several minutes and become insoluble. By incorporating bis-phenols with several —CH=CH—CO— groups, it is possible to manage with small quantities in order to be able to obtain clear effects from the action of light.

They can be used with particular advantage as auxiliaries in the reproduction art, since exposure to light cross-links the high molecular layers at the places reached by the light, whereas the places not reached by light remain unchanged. By aftertreatment with a developer, the unexposed places can then be removed. It is a surprising fact that the process according to the invention gives very sharp contours in the reproduction art and permits the preparation of difficult reproductions.

In this connection, it is preferable to apply the light-sensitive compound of high molecular weight to a support in the form of a solution which dries thereon as a film. Any type of solvent can be used without the suitability of the products claimed being impaired by the nature of the solvent. For example, ketones, esters, alcohols, ethers, acid amides, hydrocarbons or their halogen or nitro derivatives or mixtures of these solvents can be used. As solvent mixtures, it is also possible to use mixtures which consist of one or more of such solvents and such substances which are not capable of dissolving the light-sensitive high molecular compounds.

The application of such solvents to a support can take place in any desired manner, for example, by spraying, brushing, casting or dipping. The centrifuging process has proved to be particularly suitable, since it is possible in this way to produce a particularly uniform film, the thickness of which can be easily reproduced.

As the support for the film, it is possible to use all the materials which are usual in the reproduction art, such as for example, zinc, copper, aluminum or magnesium, their oxides, the normal bimetallic and trimetallic plates, certain types of paper and film supports which are formed with a base of organic colloids, but also other substances, such as for example, glass or plastics.

The exposures of the films prepared in this manner, is carried out with the auxiliary means and light sources which are usual in the reproduction art. Lined, screen or half-tone negative or diapositives can be used as the original.

After the exposure, those parts of the film which are not affected by the light are dissolved out by means of a solvent. For this purpose, it is possible to use the same solvents or solvent mixtures in which the light-sensitive high molecular compounds have previously been dissolved. In certain cases, however, the composition of such a developer may be different in order to produce certain effects, such as for example a particularly gentle or a particularly rapid development of the copy. Particular effects can also be obtained, for example by adding dyestuffs, a colouring of the copy taking place concurrently with the development. The copy thus obtained can also be subsequently dyed in order to be able to check it for any defects which may be present.

At this stage, the copy is ready for the conventional printing process. The advantage of the products of the invention as compared with those formerly used in the reproduction art is in that the actual film support can be coated a long time before being actually used, without it being possible to detect any decrease in the light sensitivity or in the developing capacity of the copying layer. It is known that this is only possible a short time beforehand, for example with plates which have been coated with chromium colloids. On the other hand, the copies prepared using the products of the invention are resistant to water, acid and alkali, whereby many new applications are provided, for example in the electrotechnical field, in which it is not possible to use chromium colloids, since they are swelled or even destroyed by water, acids or alkalis, even after exposure. Moreover, the copies prepared using the products of the invention are substantially more resistant to mechanical stresses than those which have been prepared with chromium colloids. This opens up many new fields of use.

The details of the present invention will become apparent to those skilled in the art from a consideration of the following working examples which are illustrative only and in no way to be construed as limiting.

The cross-linked polycarbonate films are characterised by a high resistance to hydrolysis.

Example 1

After adding 100 ml. of methylene chloride to a solution of 34.2 parts by weight (0.15 mol.) of 2,2-(4,4'-dihydroxydiphenyl)-propane and 27.0 parts by weight (0.1 mol.) of 4,4'-dihydroxy-3-methoxy chalcone in 280 ml. of water and 28.5 parts by weight of sodium hydroxide, 30 parts by weight of phosgene are introduced into this solution at 25° C. over a period of 2 hours. After adding 1.3 parts by weight of triethylbenzyl ammonium chloride, the 2-phase reaction mixture is stirred vigorously. The orange-yellow aqueous phase completely loses its colour after 1½ hours. After separating the aqueous layer, the viscous methylene chloride phase is acidified with dilute hydrochloric acid, using a highly efficient stirrer mechanism, and finally it is washed with water until it is neutral. The polycarbonate forms as friable granules, and it is dried in a vacuum chamber. The K-value in m-cresol (1% solution) is 33.6.

Films cast from a 3% cyclohexanone solution are suitable for the production of printing matrices.

After the light-sensitive polycarbonate film has been irradiated with ultra-violet light through a photographic positive or negative, the image is developed with methylene chloride or a mixture of cyclohexanone and dimethyl formamide (1:3).

The 4.4'-dihydroxy-3-methoxy-chalcone which is used is prepared as follows: 152 parts by weight (1 mol) of vanillin and 136 parts by weight of p-hydroxy-acetophenone are dissolved in 500 ml. of alcohol. The solution is saturated with gaseous hydrogen chloride while cooling with ice. The precipitate formed is sharply filtered by suction and it is introduced into 2 litres of water. The crude 4.4'-dihydroxy-3-methoxy-chalcone separating out from the salt is filtered by suction, washed until free from chlorine and recrystallised from 2.5 litres of alcohol. A first fraction of 175.5 parts by weight corresponding to 65% of the theoretical is obtained, and on concentrating the filtrate to 1 litre, a second fraction of 15.5 parts by weight corresponding to 5.7% is obtained. M.P. 233–235° C.

$C_{16}H_{14}O_4$ (270) calculated: C, 71.1; H, 5.2; O, 23.7. Found: C, 70.86; H, 5.23; O, 23.60.

The diacetyl derivative melts at 158–159° C.

$C_{20}H_{18}O_6$ (354) calculated: C, 67.8; H, 5.1; O, 27.1. Found: C, 67.76; H, 5.19; O, 27.09.

Example 2

108 parts by weight (0.475 mol) of 2,2-(4,4'-dihydroxydiphenyl)-propane and 6.0 parts by weight (0.025 mol) of 4,4'-dihydroxy-chalcone are dissolved with 57 parts by weight of caustic soda in 560 ml. of water. After adding 200 ml. of methylene chloride, 60 parts by weight of phosgene are introduced at 25° C. over a period of two hours and the mixture is worked up analogously to Example 1. The resulting polycarbonate has a K-value of 58.8.

From a 20% solution in methylene chloride, films with a thickness of 100µ are obtained on metal supports. The mechanical properties of this film are substantially changed by exposure with an arc lamp, as will be seen from the following table:

|  | Elongation, Percent | Impact strength, cc. kg./cm.³ |
|---|---|---|
| Untreated | 123 | 245 |
| 20 minute exposure | 111 | 350 |
| 60 minute exposure | 75 | 362 |

In order to obtain filaments, an 18% solution of the polycarbonate in methylene chloride is fed through a spinning nozzle into a vertically arranged spinning device which is known from the manufacture of acetate rayon and is heated to 50° C. The solvent in the filaments discharging from the spinning nozzle or spinneret is evaporated by means of air which is heated to 40° C. and which is conveyed downward parallel to the filaments. The filament is wound at 110 m./min. on to a bobbin at the bottom end of the spinning shaft. At room temperature, the filament can be stretched to twice its lengh with an increase in its strength values.

At temperatures in the region of 170° C. it is possible to stretch the filament to four times its original value, it being possible at the same time to observe the formation of crystallites. After exposure for a short time with a quartz lamp, the filament which previously had good solubility in methylene chloride becomes completely insoluble.

Example 3

34.2 parts by weight (0.15 mol) of 2,2-(4,4'-dihydroxydiphenyl)-propane, 23.5 parts by weight (0.0875 mol) of 4,4'-dihydroxy-diphenyl cyclohexane and 3.0 parts by weight (0.0125 mol) of 4,4'-dihydroxy-chalcone are dissolved with 28.5 parts by weight of caustic soda in 280 ml. of water. 100 ml. of methylene chloride are added and 30 parts by weight of phosgene are introduced at 25° C. over a period of 2 hours. The further procedure is as described in Example 1. The polycarbonate obtained in this example has improved solubility by comparison with the product prepared according to Example 2. It is soluble in methylene chloride, chloroform, chlorobenzene, nitrobenzene, trichlorethylene, cyclohexanone and dimethyl formamide. The K-value is 65.2.

Example 4

54.0 parts by weight (0.2375 mol) of 2,2'-(4,4'-dihydroxydiphenyl)-propane and 6.4 parts by weight (0.125 mol) of 1,4-phenylene-bis-(4-hydroxy-phenyl-vinyl-ketone) are dissolved with 28.5 parts by weight of caustic soda in 280 ml. of water. After adding 100 ml. of cyclohexanone, 30 parts by weight of phosgene are introduced in 2 hours at 25° C. and the further procedure is as set forth in Example 1. The resulting polycarbonate is soluble in cyclohexanone or dimethyl formamide, and the K-value is 26.8.

The 1,4-phenylene-bis-(4-hydroxyphenyl-vinyl-ketone)

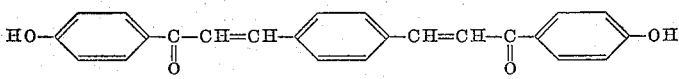

which was used is prepared in the following manner:

26.8 parts by weight (0.2 mol) of terephthalic dialdehyde and 60 parts by weight of 4-hydroxybenzaldehyde are dissolved in 350 ml. of alcohol. 250 ml. of 10% caustic soda solution are added dropwise at room temperature and the solution is left to stand overnight. The orange-yellow solution is acidified with dilute hydrochloric acid, the crude product (yield 85%) is recrystallised from dimethyl formamide (300 ml. dimethyl formamide/100 g. substance). The compound crystallises with 2 mols of dimethyl formamide. M.P. 300° C.

$C_{24}H_{18}O_4$ (370) 2 mols $C_3H_7NO$ calculated: C, 69.8; H, 6.2; O, 18.6; N, 5.40. Found: C, 70.03; H, 6.19; O, 18.66; N, 5.45.

*Example 5*

4.8 parts by weight (0.02 mol) of 4,4'-dihydroxy-chalcone and 4.56 parts by weight (0.02 mol) of 2,2-(4,4'-dihydroxydiphenyl)-propane are polycondensed with 8.6 parts by weight (0.04 mol+0.5%) of diphenyl carbonate in a nitrogen atmosphere in the presence of 0.001 part by weight of lithium hydride. The reaction mixture is heated within one hour to 200° C., kept for 2 hours at 200° C. and further condensed at 230° C. Finally, for further removal of phenol, a vacuum is applied for 1½ hours at 200–215° C.

*Example 6*

6.56 parts by weight (0.02 mol) of 4,4'-bis-(hydroxyethyl ether)-chalcone and 4.56 parts by weight (0.02 mol) of 2,2-(4,4'-dihydroxydiphenyl)-propane are polycondensed with 8.60 parts by weight (0.04 mol+0.5%) of diphenyl carbonate in the presence of 0.0003 part by weight of lithium hydride under the conditions mentioned in Example 5. The condensate is dissolved in methylene chloride and the solution added dropwise to methanol. The polycarbonate has a K-value of 31 after being thoroughly dried in vacuo.

*Example 7*

6.56 parts by weight (0.02 mol) of 4,4'-bis-(hydroxyether)-chalcone and 6.32 parts by weight (0.02 mol) of 2,2-[4,4'-bis-(hydroxyethyl-ether)-diphenyl]-propane are polycondensed together with 8.60 parts by weight (0.04 mol+0.5% excess) of diphenyl carbonate in a nitrogen atmosphere. The components are heated to 200° C. in the first hour, the melt is kept for 1½ hours at this temperature, which is then raised to 230° C. The melt is then condensed at 230° C. for 1½ hours and the residual phenol is removed in a vacuum of 0.2 to 0.5 mm. at 200 to 215° C. The resulting polycondensate is inter alia only soluble in methylene chloride, cyclohexanone, dimethyl formamide and m-cresol; it can be precipitated from methylene chloride by introducing dropwise into methanol. The $\eta_{rel.}$ of a 1% solution in m-cresol is 1.83, corresponding to a K-value of 55.

2–4% solutions of the light-sensitive polycarbonate in a mixture of methylene chloride and cyclohexanone (1:1) are suitable for the production of printing matrices. Films cast therefrom become insoluble in less than 1 minute on being exposed to ultra-violet light. A solvent mixture consisting of 1 part by volume of glycol monomethyl ether acetate and 3 parts by volume of methylene chloride and dyed with crystal violet serves for the development of the matrix.

If the 2,2-[4,4'-bis-(hydroxyethyl ether)-diphenyl]-propane in the present example is replaced by a specified number of parts of 1,5-naphthylene-bis-hydroxyethyl ether or resorcinol-bis-hydroxyethyl ether, polycarbonates which can be cross-linked easily are also obtained by exposure to light.

The 4,4'-bis-(hydroxyethyl ether)-chalcone which is used is prepared as follows: 192 parts by weight (0.8 mol) of 4,4'-dihydroxy-chalcone are dissolved with 64 parts by weight of caustic soda in 800 ml. of water. 144 parts by weight of ethylene chlorhydrin are added dropwise at 50° C. over a period of 1½ hours and the reaction mixture is thereafter heated for another three hours at 75 to 80° C. After cooling, the precipitated 4,4'-bis-(hydroxyethyl - ether) - chalcone is filtered by suction, washed with dilute soda solution and the crude product is recrystallised from 2 litres of alcohol. Yield 202 g.= 76.5% of the theoretical. M.P. 149 to 150° C.

$C_{19}H_{20}O_5$ (328) calculated: C, 69.5%; H, 6.1%; O, 24.4%. Found: C, 69.71%; H, 6.15%; O, 24.28%.

*Example 8*

9.48 parts by weight (0.03 mol) of 2,2-[4,4'-bis-(hydroxyethyl-ether)-diphenyl]-propane and 4.58 parts by weight (0.01 mol) of 1,4-phenylene-bis-[4'-(β-hydroxyethoxy)-phenyl-vinyl-ketone] are polycondensed with 8.60 parts by weight of diphenyl carbonate. In the first hour, the temperature is raised to 200° C., which is maintained for 1½ hours and then further condensation takes place for 1½ hours at 230° C. An oil sump vacuum is applied for 1 hour at 180° C. The resulting resin is dissolved in 100 ml. of methylene chloride and added dropwise to 1.5 litres of methanol for precipitation purposes. Yield: 82% of the methanol theoretical; K-value is 47.

Films cast from this polycarbonate are exceptionally sensitive to light. An exposure of such a film for 30 seconds through a suitable template with a quartz lamp is sufficient for the production of serviceable printing matrices. The content of groups producing the cross-linking under light is 7.15% of —CH=CH—CO—.

The 1,4-phenylene-bis-[4'-(β-hydroxyethoxy)-phenyl-vinyl-ketone]

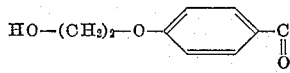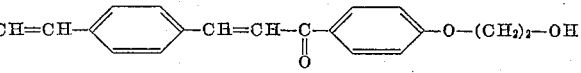

which is employed is prepared as follows: 37.0 parts by weight of 1,4-phenylene - bis - (4'-hydroxyphenyl-vinyl-ketone) are dissolved in 8.0 parts by weight of caustic soda in 50 ml. of water. 18.0 parts by weight of ethylene chlorhydrin are added dropwise at 50° C. to this solution during 1½ hours and the reaction mixture is heated for another 3 hours at 75–80° C. The orange-yellow precipitate is filtered off by suction, washed with dilute soda solution and with water, dried and recrystallised from 4 ml. of cyclohexanone/1 part by weight of substance. M.P. 248–250° C.

$C_{28}H_{26}O_6$ (458) calculated: C, 73.4; H, 5.7; O, 20.9. Found: C, 73.38; H, 5.72; O, 20.85.

*Example 9*

6.32 parts by weight (0.02 mol) of 2,2-[4,4'-bis-(hydroxyethyl-ether)-diphenyl]-propane and 7.08 parts by weight (0.02 mol) of distyryl ketone 4,4'-bis-hydroxyethyl ether are heated with 8.60 parts by weight of diphenyl carbonate for 4 hours to 200° and thereafter a vacuum is applied for 15 to 20 minutes at 170 to 180° C. The polycarbonate is dissolved in 100 ml. of methylene chloride and this solution is added dropwise and while stirring to 1.5 litres of methanol. The K-value is 333.5.

From a 3% solution in methylene chloride and cyclohexanone, it is possible to cast films which become insoluble in 30 seconds on exposure with ultra-violet light.

The distyryl ketone-4,4'-bis-hydroxyethylether which is used is prepared in the following way: 53.2 parts by weight of 4,4'-dihydroxy-distyryl ketone (0.2 mol) are dissolved with 16.0 parts by weight of caustic soda in 100 ml. of water. 36.0 parts by weight of ethylene chlorohydrin are added dropwise at 50° C. and the reaction mixture is kept for another 3 hours at 75 to 80° C. It is filtered by suction, washed with dilute soda solution and recrystallised from 12 to 14 ml. of alcohol/1 part by weight of substance. Yield 80%; M.P. 163–164° C.

$C_{21}H_{22}O_5$ (354) calculated: C, 71.2; H, 6.2; O, 22.6%. Found: C, 71.36; H, 6.33; O, 22.52%.

*Example 10*

65.6 parts by weight of 4,4'-bis-(hydroxy ethyl ether)-chalcone and 43.0 parts by weight of diphenyl carbonate are polycondensed in the presence of 0.005 part by weight of sodium methylate in a nitrogen atmosphere. The reaction mixture is heated within 1 hour to 200° C., kept for 2 hours at 200° C. and further condensed at 230° C. Finally, for further removal of phenol a vacuum is applied for 1½ hours at 200° C. The condensate is dissolved in methylene chloride and the solution added dropwise to methanol. The precipitated polycarbonate is thoroughly dried in vacuo.

What is claimed is:

1. In the process of making organic polycarbonates by reacting a member selected from the group consisting of organic bis-phenols and their bis-hydroxy alkyl ethers with a member selected from the group consisting of phosgene and diphenyl carbonate, the improvement of making a light-sensitive organic polycarbonate wherein a member selected from the group consisting of organic bis-phenols and their bis-hydroxy alkyl ethers, containing at least one —CH=CH—CO— group in the chain connecting the two phenylene groups is employed.

2. Process for the production of a light-sensitive compound which comprises reacting a mixture of 4,4'-bis-(hydroxy ethyl ether)-chalcone and 2,2-[4,4'-bis-(hydroxy ethyl ether)-diphenyl]-propane with diphenyl carbonate until a polycarbonate is formed.

3. Process for the production of a light-sensitive compound which comprises reacting a mixture of 4,4'-dihydroxy chalcone and 2,2-(4,4'-dihydroxy diphenyl)-propane with phosgene until a polycarbonate is formed.

4. Process for the production of a light-sensitive compound which comprises reacting a mixture of 2,2-[4,4'-bis-(hydroxy ethyl ether)-diphenyl]-propane and 1,4-phenylene - bis - [4' - (β - hydroxy ethoxy) - phenyl-vinyl-ketone] with diphenylcarbonate until a polycarbonate is formed.

5. Process for the production of a light-sensitive compound which comprises reacting a mixture of 2,2-[4,4'-bis-(hydroxy ethyl ether)-diphenyl]-propane and distyryl ketone-4,4'-bis-hydroxy ethyl ether with diphenyl carbonate until a polycarbonate is formed.

6. The polycarbonate obtained according to the process of claim 2.

7. The polycarbonate obtained according to the process of claim 3.

8. The polycarbonate obtained according to the process of claim 4.

9. The polycarbonate obtained according to the process of claim 5.

References Cited in the file of this patent

UNITED STATES PATENTS 2,816,091    Smith et al. _____ Dec. 10, 1957

FOREIGN PATENTS 772,627    Great Britain _____ Apr. 17, 1957